US012563431B2

(12) United States Patent
Damnjanovic et al.

(10) Patent No.: US 12,563,431 B2
(45) Date of Patent: Feb. 24, 2026

(54) INTER-CELL MOBILITY

(71) Applicant: QUALCOMM Incorporated, San Diego, CA (US)

(72) Inventors: Jelena Damnjanovic, Del Mar, CA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 526 days.

(21) Appl. No.: 17/812,697

(22) Filed: Jul. 14, 2022

(65) Prior Publication Data

US 2024/0022937 A1     Jan. 18, 2024

(51) Int. Cl.
| | |
|---|---|
| *H04W 24/10* | (2009.01) |
| *H04L 5/00* | (2006.01) |
| *H04W 16/28* | (2009.01) |

(52) U.S. Cl.
CPC ........... *H04W 24/10* (2013.01); *H04L 5/0048* (2013.01); *H04W 16/28* (2013.01)

(58) Field of Classification Search
CPC . H04W 24/10; H04W 16/28; H04W 36/0058; H04W 36/0055; H04W 88/085; H04W 36/0069; H04L 5/0048; H04L 5/001; H04L 5/0023; H04L 5/0073; H04L 25/0224; H04L 5/0032; H04L 5/0098
See application file for complete search history.

(56) References Cited

U.S. PATENT DOCUMENTS

| | | | | |
|---|---|---|---|---|
| 2020/0267711 A1* | 8/2020 | Josan | ..................... | H04L 5/0023 |
| 2021/0329546 A1* | 10/2021 | Wang | .................... | H04L 5/0053 |
| 2022/0095127 A1* | 3/2022 | Tang | ..................... | H04L 5/0098 |
| 2023/0362817 A1* | 11/2023 | Da Silva | ............... | H04W 24/10 |
| 2023/0422165 A1* | 12/2023 | Sun | ......................... | H04L 5/001 |
| 2024/0064785 A1* | 2/2024 | Tsuboi | .................. | H04W 76/27 |
| 2024/0235774 A1* | 7/2024 | Nimbalker | ............ | H04L 5/0051 |

FOREIGN PATENT DOCUMENTS

| | | |
|---|---|---|
| EP | 2227056 A1 | 9/2010 |
| EP | 3528540 A1 | 8/2019 |
| WO | 2021066700 A1 | 4/2021 |
| WO | 2021248097 A1 | 12/2021 |
| WO | 2022086645 A1 | 4/2022 |

OTHER PUBLICATIONS

International Search Report and Written Opinion—PCT/US2023/069676—ISA/EPO—Oct. 24, 2023.

* cited by examiner

*Primary Examiner* — Sharmin Chowdhury
(74) *Attorney, Agent, or Firm* — ArentFox Schiff, LLP

(57) ABSTRACT

Aspects of this disclosure are directed to communications for reducing latency associated with cell mobility and switching activated cells. The techniques described herein relate to a network node configured to: select a deactivated cell based on at least one of a measurement report received from a user equipment (UE) or a first communication parameter, the deactivated cell being one of a plurality of cells within a cell set managed by the network node. The network node is also configured to transmit, to the UE via an activated cell of the cell set, a signal including: (i) an identifier of the deactivated cell, and (ii) a second communication parameter of the deactivated cell.

9 Claims, 12 Drawing Sheets

700

800

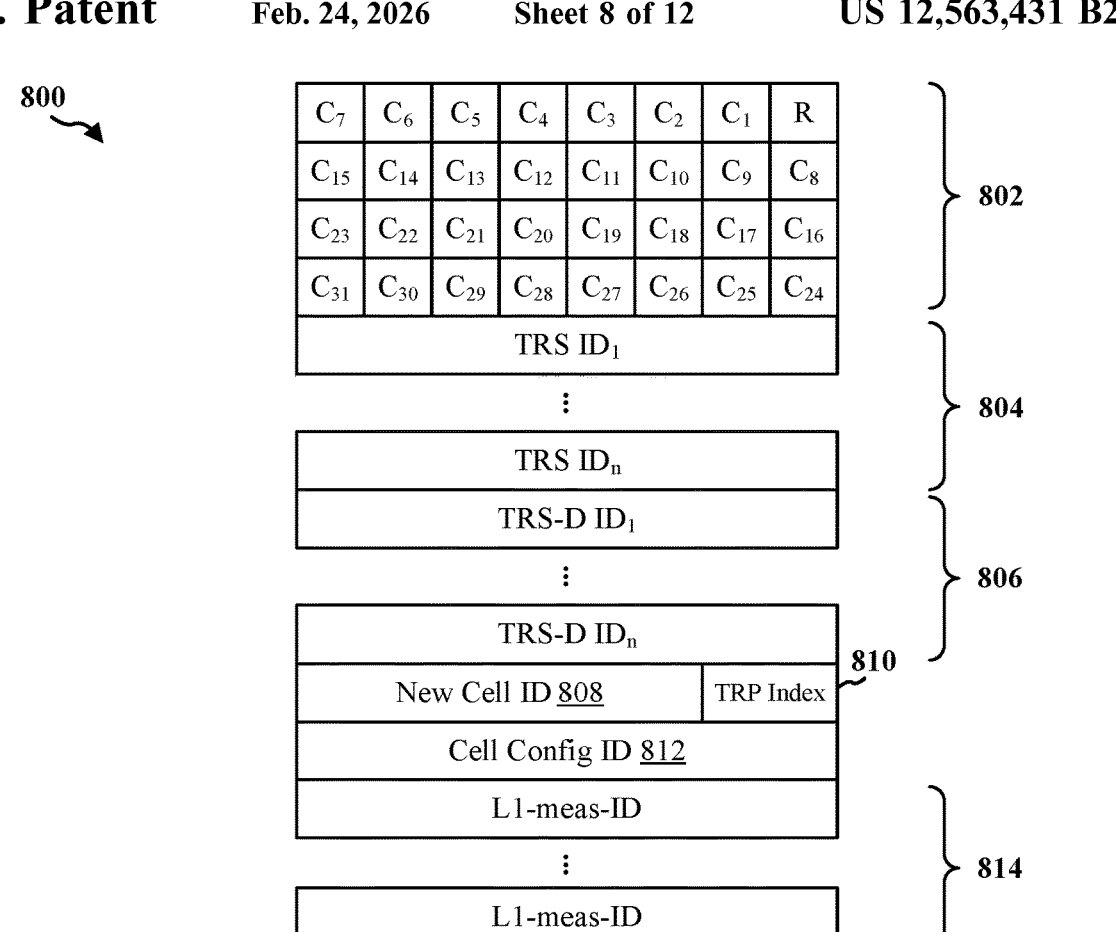

| $C_7$ | $C_6$ | $C_5$ | $C_4$ | $C_3$ | $C_2$ | $C_1$ | R |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |

802

$TRS\ ID_1$

⋮

$TRS\ ID_n$

804

$TRS\text{-}D\ ID_1$

⋮

$TRS\text{-}D\ ID_n$

806

| New Cell ID 808 | TRP Index |
|---|---|

810

Cell Config ID 812

L1-meas-ID

⋮

L1-meas-ID

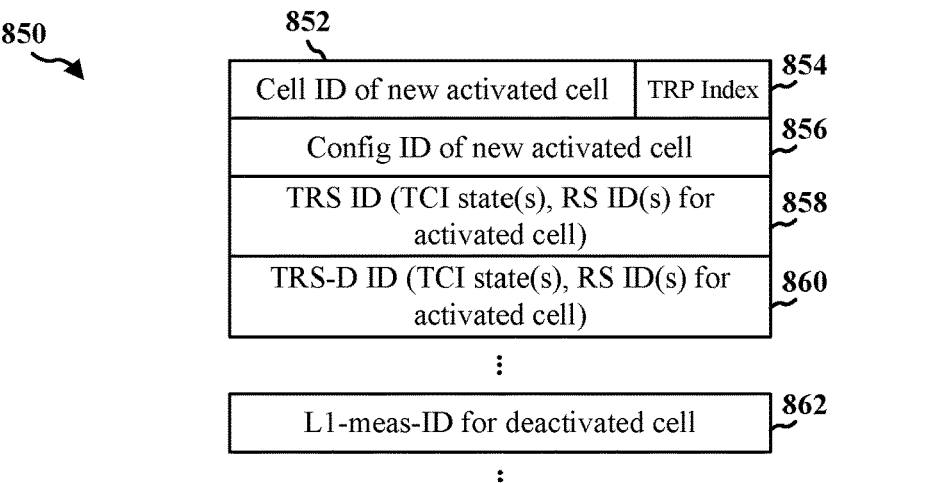

852

| Cell ID of new activated cell | TRP Index |
|---|---|

854

Config ID of new activated cell

856

TRS ID (TCI state(s), RS ID(s) for activated cell)

858

TRS-D ID (TCI state(s), RS ID(s) for activated cell)

860

⋮

L1-meas-ID for deactivated cell

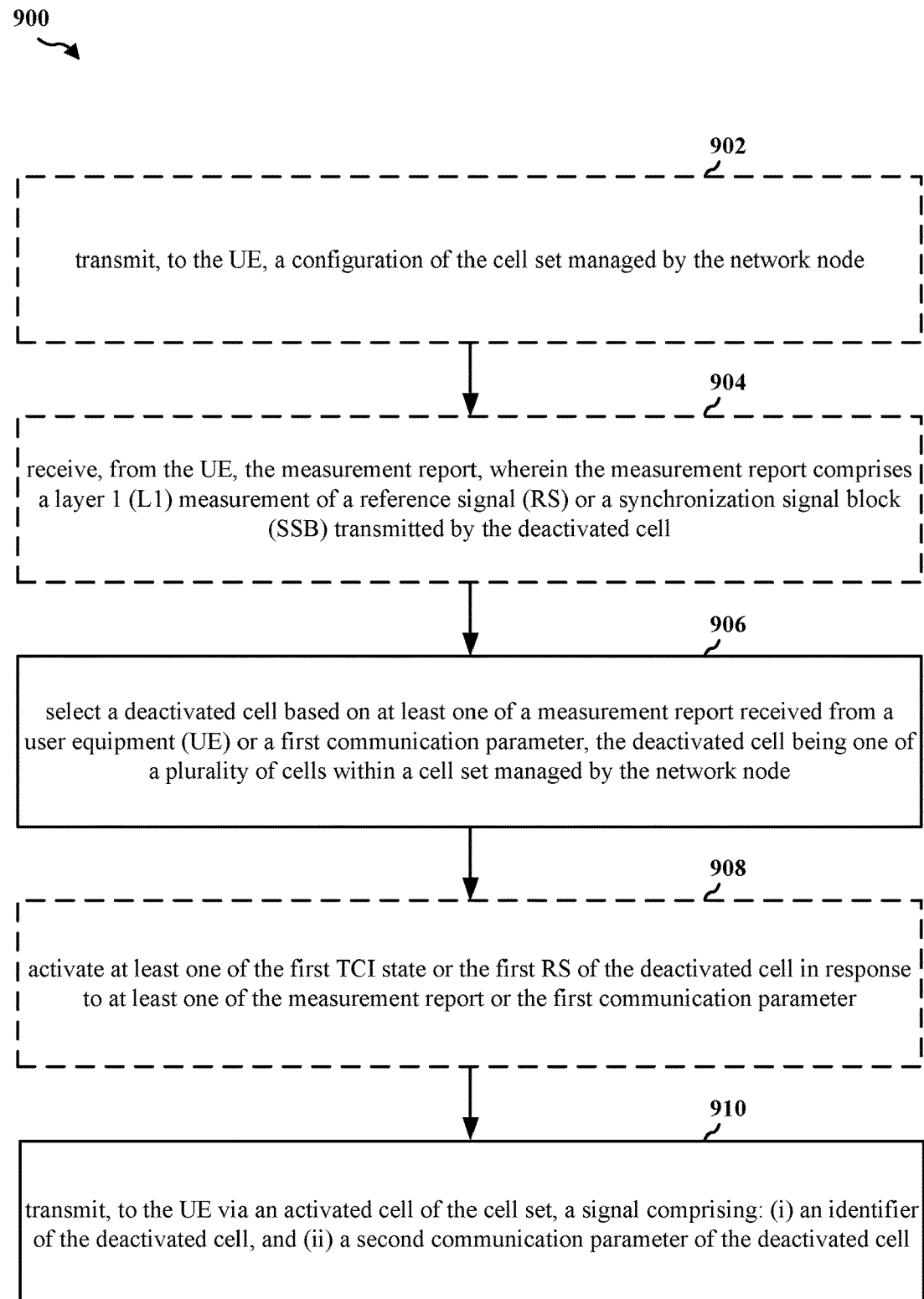

transmit, to the UE, a configuration of the cell set managed by the network node

902 receive, from the UE, the measurement report, wherein the measurement report comprises a layer 1 (L1) measurement of a reference signal (RS) or a synchronization signal block (SSB) transmitted by the deactivated cell

904 select a deactivated cell based on at least one of a measurement report received from a user equipment (UE) or a first communication parameter, the deactivated cell being one of a plurality of cells within a cell set managed by the network node

906 activate at least one of the first TCI state or the first RS of the deactivated cell in response to at least one of the measurement report or the first communication parameter

908 transmit, to the UE via an activated cell of the cell set, a signal comprising: (i) an identifier of the deactivated cell, and (ii) a second communication parameter of the deactivated cell

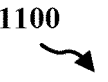

1102 receive, via the activated cell, a configuration of the cell set managed by the network node

1104 transmit, to the network node, a measurement report based on a layer 1 (L1) measurement of a reference signal (RS) or a synchronization signal block (SSB) transmitted by the deactivated cell, wherein the signal is received in response to the measurement report

1106 receive, via an activated cell of a cell set managed by a network node, a signal comprising: (i) an identifier of a deactivated cell, and (ii) a second communication parameter of the deactivated cell, the deactivated cell being one of a plurality of cells within the cell set

1108 perform beam refinement with the deactivated cell based on the second communication parameter

FIG. 11

INTER-CELL MOBILITY

BACKGROUND

Technical Field

The present disclosure generally relates to communication systems, and more particularly, to layer 1 (L1) and layer 2 (L2) inter-cell mobility.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to a network node for wireless communication, including: a memory; and at least one processor coupled to the memory and configured to: select a deactivated cell based on at least one of a measurement report received from a user equipment (UE) or a first communication parameter, the deactivated cell being one of a plurality of cells within a cell set managed by the network node; and transmit, to the UE via an activated cell of the cell set, a signal including: (i) an identifier of the deactivated cell, and (ii) a second communication parameter of the deactivated cell.

In some aspects, the techniques described herein relate to a user equipment (UE) for wireless communication, including: a memory; and at least one processor coupled to the memory and configured to: receive, via an activated cell of a cell set managed by a network node, a signal including: (i) an identifier of a deactivated cell, and (ii) a second communication parameter of the deactivated cell, the deactivated cell being one of a plurality of cells within the cell set; and perform beam refinement with the deactivated cell based on the second communication parameter.

Certain aspects relate to a method for wireless communication by a network node. In some examples, the method includes selecting a deactivated cell based on at least one of a measurement report received from a user equipment (UE) or a first communication parameter, the deactivated cell being one of a plurality of cells within a cell set managed by the network node. In some examples, the method includes transmitting, to the UE via an activated cell of the cell set, a signal comprising: (i) an identifier of the deactivated cell, and (ii) a second communication parameter of the deactivated cell.

Certain aspects relate to a method for wireless communication by a user equipment (UE). In some examples, the method includes receiving, via an activated cell of a cell set managed by a network node, a signal comprising: (i) an identifier of a deactivated cell, and (ii) a second communication parameter of the deactivated cell, the deactivated cell being one of a plurality of cells within the cell set. In some examples, the method includes performing beam refinement with the deactivated cell based on the second communication parameter.

Certain aspects relate to a network node. In some examples, the network node includes means for selecting a deactivated cell based on at least one of a measurement report received from a user equipment (UE) or a first communication parameter, the deactivated cell being one of a plurality of cells within a cell set managed by the network node. In some examples, the network node includes means for transmitting, to the UE via an activated cell of the cell set, a signal comprising: (i) an identifier of the deactivated cell, and (ii) a second communication parameter of the deactivated cell.

Certain aspects relate to a method for wireless communication by a user equipment (UE). In some examples, the UE includes means for receiving, via an activated cell of a cell set managed by a network node, a signal comprising: (i) an identifier of a deactivated cell, and (ii) a second communication parameter of the deactivated cell, the deactivated cell being one of a plurality of cells within the cell set. In some examples, the UE includes means for performing beam refinement with the deactivated cell based on the second communication parameter.

Certain aspects relate to a non-transitory computer-readable medium having instructions stored thereon that, when executed by a network node, cause the network node to perform operations. In some examples, the operations include selecting a deactivated cell based on at least one of a measurement report received from a user equipment (UE) or a first communication parameter, the deactivated cell being one of a plurality of cells within a cell set managed by the network node. In some examples, the operations include transmitting, to the UE via an activated cell of the cell set, a signal comprising: (i) an identifier of the deactivated cell, and (ii) a second communication parameter of the deactivated cell.

Certain aspects relate to a non-transitory computer-readable medium having instructions stored thereon that, when executed by a user equipment (UE), cause the UE to perform operations. In some examples, the operations include receiving, via an activated cell of a cell set managed by a network node, a signal comprising: (i) an identifier of a deactivated cell, and (ii) a second communication parameter of the deactivated cell, the deactivated cell being one of a plurality of cells within the cell set. In some examples, the operations include performing beam refinement with the deactivated cell based on the second communication parameter.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 8A and 8B are block diagrams conceptually illustrating example medium access control (MAC) control elements (CEs).

FIG. 9 is a flowchart of a method of wireless communication.

FIG. 11 is a flowchart of a method of wireless communication.

DETAILED DESCRIPTION

Figure 1:
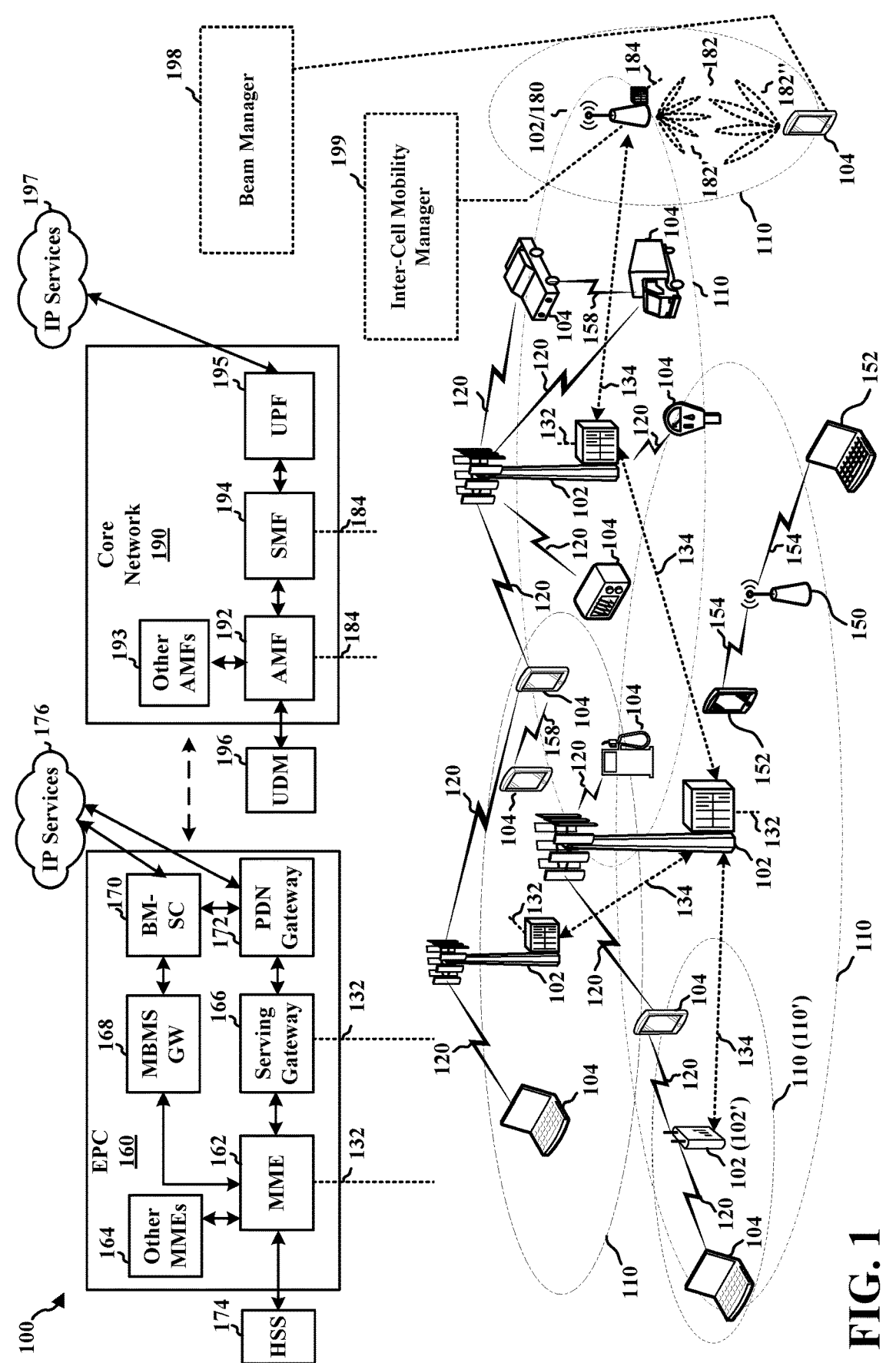
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Certain aspects of the disclosure are directed to methods and apparatus for inter-cell mobility. For example, aspects are directed to the configuration and maintenance of multiple candidate cells to provide for rapid application of candidate cell configurations and dynamic switching among candidate cells (e.g., such as special cells (SpCells) and secondary cells (SCells)). In some examples, the inter-cell mobility may be based on layer 1 (L1) and/or layer 2 (L2) signaling and measurements. Specifically, the inter-cell mobility may be based on signal/beam measurement, measurement reporting, and communications via L1 and L2.

In certain aspects, a user equipment (UE) may receive cell set configuration information from a base station or a network node (e.g., a centralized unit (CU), a distributed unit (DU), and/or a radio unit (RU) that makes up a portion of the base station). That is, the base station may configure a cell set that includes a CU, a DU, and multiple RUs that are managed by the CU and DU. Each combination of the CU and DU with one of the multiple RSs may constitute a cell. In some examples, the CU or DU may determine cell set configuration, then transmit the configuration to the UE via an RU.

In one example, the cell set configuration is provided by the DU via initial configuration when the UE is establishing connection with a cell. In other words, prior to any cells being configured for communication with the UE, when the UE is still establishing communication with the base station. Thus, when the UE receives the initial configuration from a cell, that cell may not yet be the serving cell for the UE. Once the serving cell has been activated and can communicate (e.g., transmit and receive wireless signaling) with the UE, the cell set configuration may be updated via the active cell or serving cell.

UE may measure signals transmitted from other RUs that are part of other cells (e.g., deactivated cells) within the cell set. For example, the UE may receive and measure a reference signal (RS) or a synchronization signal block (SSB) transmitted by other RUs that are part of deactivated cells. The UE may send a measurement report that includes an indication of the measured signals to the DU via an RU of the active cell or serving cell.

In some examples, the initial configuration may include measuring and reporting information, such as the type of measurement (e.g., received signal strength indicator (RSSI), reference signal received power (RSRP), reference signal received quality (RSRQ), signal to interference plus noise ratio (SINR), etc.) that the UE is to perform on signaling received from deactivated cells, the rate at which the UE performs the measurement (e.g., periodic, aperiodic, or event triggered), and/or how often the UE sends the report to the DU.

Based on the measurement report received from the UE, the DU may select a deactivated cell as a candidate active cell or candidate SpCell/SCell. For example, the DU may determine that the UE received a high-quality signal from a first cell associated with a first RU and may determine that the first cell would be a good replacement active cell for the UE. The selection may also be based (or alternatively based)

on other communication parameters such as location of the UE, direction of movement of the UE, the cell location, the load on the cell (e.g., whether multiple cells have the same channel quality report and one cell has a smaller load, the DU may select the cell with the smaller load).

The DU may then activate a TCI state of the selected deactivated cell and transmit: (i) an indication of the selection of the deactivated cell (e.g., a cell identifier of the deactivated cell), and/or (ii) the activated TCI state of the deactivated cell to the UE via the current activated cell or serving cell. The UE receives the activated TCI state of the deactivated cell, and the UE may perform beam refinement based on the TCI state. This gives the UE a jumpstart on determining which beam to use for communication with the deactivated cell once the deactivated cell is activated, making the activation much faster. That is, by providing the UE with an activated TCI state of the deactivated cell, communication latency between the newly activated cell and the UE is reduced because the UE has determined an adequate beam for communication with the cell prior to its activation.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Throughout the disclosure, a "network node" may be used to refer to a base station, or a disaggregated component of a base station. For example, a base station may be implemented as an aggregated base station (e.g., as described in reference to FIG. 4) or as a disaggregated base station (e.g., as described in reference to FIG. 5). Thus, in some examples, a network node may refer to one or more of a central unit (CU), a distributed unit (DU), a radio unit (RU), a near-real time (near-RT) radio access network (RAN) intelligent controller (RIC), and/or a non-real time (non-RT) RIC. In some examples, the network node may be an integrated access and backhaul (IAB) node, a relay node, etc.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 102/180 may include an inter-cell mobility module 199, configured to: select a deactivated cell based on at least one of a measurement report received from a user equipment (UE) or a first communication parameter, the deactivated cell being one of a plurality of cells within a cell set managed by the network node; and transmit, to the UE via an activated cell of the cell set, a signal comprising: (i) an identifier of the deactivated cell, and (ii) a second communication parameter of the deactivated cell.

Referring again to FIG. 1, in certain aspects, the UE 104 may include a beam manager 198 configured to receive, via an activated cell of a cell set managed by a network node, a signal comprising: (i) an identifier of a deactivated cell, and (ii) a second communication parameter of the deactivated cell, the deactivated cell being one of a plurality of cells within the cell set; and perform beam refinement with the deactivated cell based on the second communication parameter.

Figures 2A, 2B, 2C, 2D:
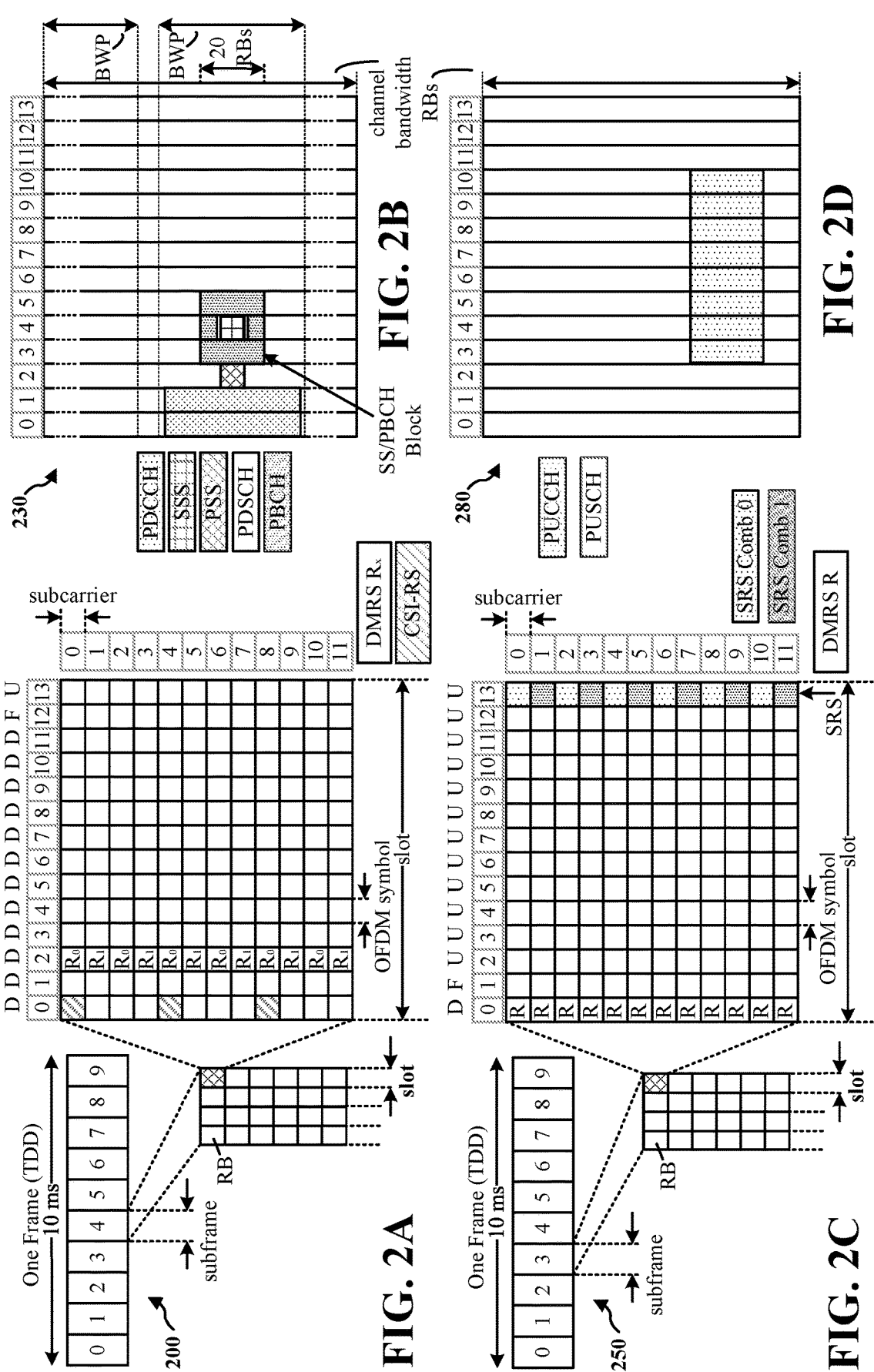
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a NR frame structure that is TDD.

Other wireless communication technologies may have a different frame structure and/or different channels. A frame, e.g., of 10 milliseconds (ms), may be divided into equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RB s in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data and may additionally be used to carry a buffer status report (BSR), a power headroom report (PHR), and/or UCI.

Figure 3:
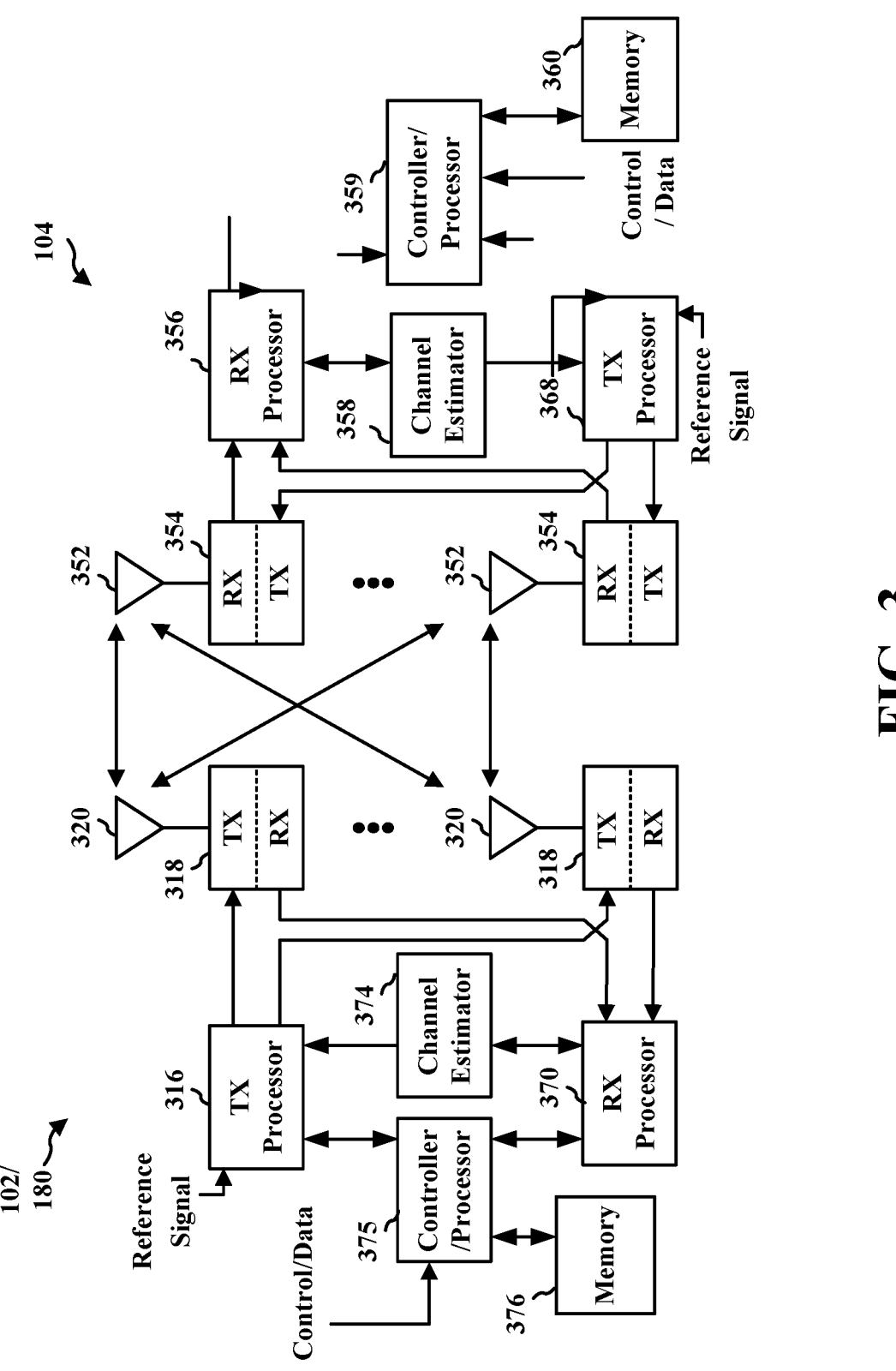
FIG. 3 is a diagram illustrating an example of a base station and user equipment (UE) in an access network.

FIG. 3 is a block diagram of a base station 102 in communication with a UE 104 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/ demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 102. These soft decisions may be based on channel estimates computed by the channel estimator 358. The soft decisions are then decoded and deinterleaved to recover the data and control signals that were originally transmitted by the base station 102 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 102, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

Figure 4:
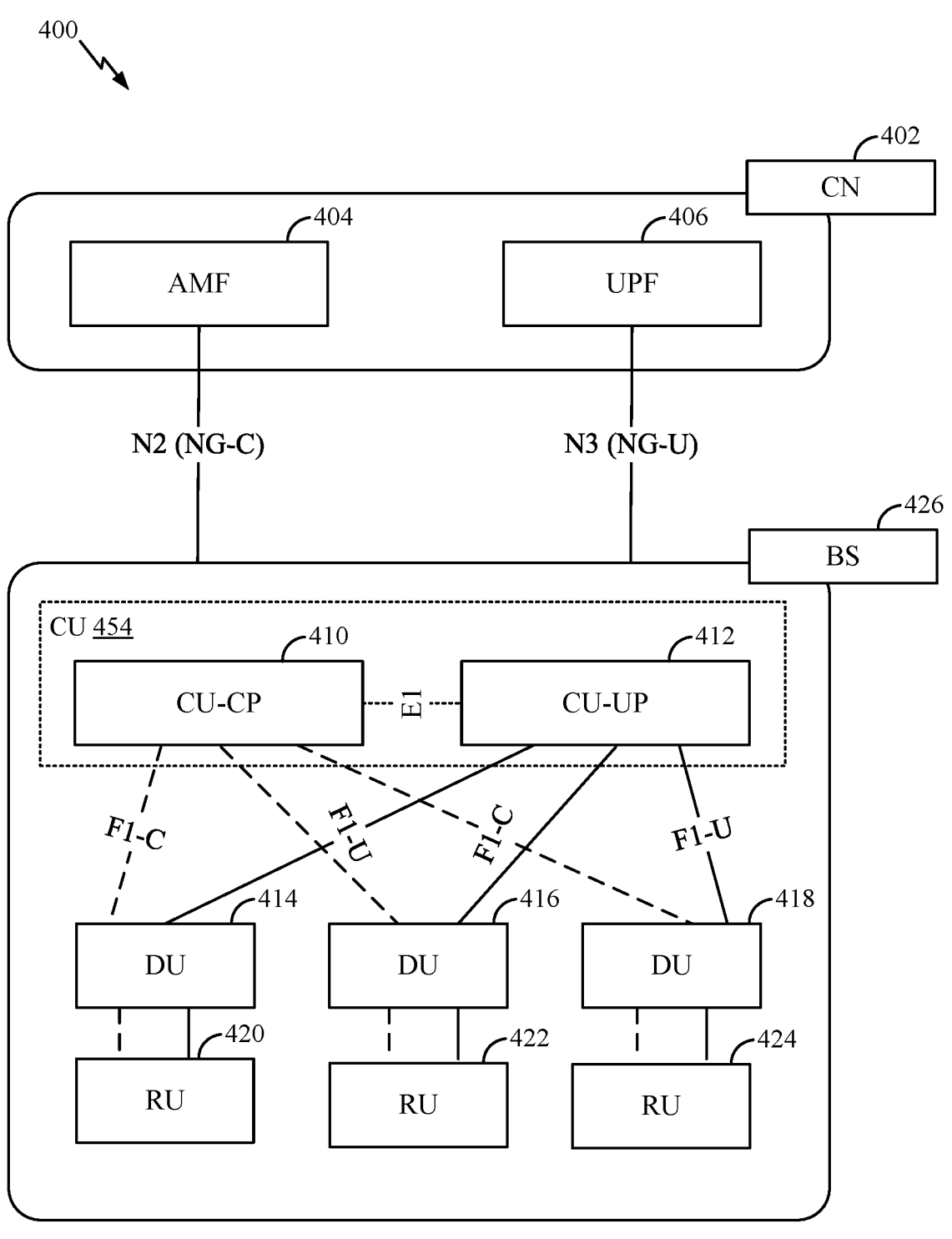
FIG. 4 illustrates an example monolithic (e.g., disaggregated) architecture of a distributed radio access network.

FIG. 4 illustrates an example monolithic (e.g., aggregated) architecture of a distributed RAN 400, which may be implemented in the wireless communications system and an access network 100 illustrated in FIG. 1. As illustrated, the distributed RAN 400 includes core network (CN) 402 and a base station 426.

The CN 402 may host core network functions. CN 402 may be centrally deployed. CN 402 functionality may be offloaded (e.g., to advanced wireless services (AWS)), in an effort to handle peak capacity. The CN 402 may include an AMF 404 and a UPF 406. The AMF 404 and UPF 406 may perform one or more of the core network functions.

The base station 426 may communicate with the CN 402 (e.g., via a backhaul interface). The base station 426 may communicate with the AMF 404 via an N2 (e.g., NG-C) interface. The base station 426 may communicate with the UPF 406 via an N3 (e.g., NG-U) interface. The base station 426 may include a central unit-control plane (CU-CP) 410, one or more central unit-user planes (CU-UPs) 412, one or more distributed units (DUs) 414-418, and one or more radio units (RUs) 420-424.

The CU-CP 410 may be connected to one or more of the DUs 414-418. The CU-CP 410 and DUs 414-418 may be connected via a F1-C interface. As shown in FIG. 4, the CU-CP 410 may be connected to multiple DUs, but the DUs may be connected to only one CU-CP. Although FIG. 4 only illustrates one CU-UP 412, the base station 426 may include multiple CU-UPs. The CU-CP 410 selects the appropriate CU-UP(s) for requested services (e.g., for a UE). The CU-UP(s) 412 may be connected to the CU-CP 410. For example, the CU-UP(s) 412 and the CU-CP 410 may be connected via an E1 interface. The CU-UP(s) 412 may be connected to one or more of the DUs 414-418. The CU-UP (s) 412 and DUs 414-418 may be connected via a F1-U interface. As shown in FIG. 4, the CU-CP 410 may be connected to multiple CU-UPs, but the CU-UPs may be connected to only one CU-CP 410.

A DU, such as DUs 414, 416, and/or 418, may host one or more TRP(s) (transmit/receive points, which may include an edge node (EN), an edge unit (EU), a radio head (RH), a smart radio head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 414-416 may be connected with one of RUs 420/422/424.

The CU-CP 410 may be connected to multiple DU(s) that are connected to (e.g., under control of) the same CU-UP 412. Connectivity between a CU-UP 412 and a DU may be established by the CU-CP 410. For example, the connectivity between the CU-UP 412 and a DU may be established using bearer context management functions. Data forwarding between CU-UP(s) 412 may be via a Xn-U interface.

The distributed RAN 400 may support fronthauling solutions across different deployment types. For example, the RAN 400 architecture may be based on transmit network capabilities (e.g., bandwidth, latency, and/or jitter). The distributed RAN 400 may share features and/or components with LTE. For example, the base station 426 may support dual connectivity with NR and may share a common fronthaul for LTE and NR. The distributed RAN 400 may enable cooperation between and among DUs 414-418, for example, via the CU-CP 412. An inter-DU interface may not be used. Logical functions may be dynamically distributed in the distributed RAN 400.

Figure 5:
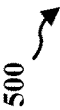
FIG. 5 is a block diagram illustrating an example disaggregated base station architecture.

FIG. 5 is a block diagram illustrating an example disaggregated base station 500 architecture. The disaggregated base station 500 architecture may include one or more CUs 510 that can communicate directly with a core network 520 via a backhaul link, or indirectly with the core network 520 through one or more disaggregated base station units (such as a near real-time (RT) RIC 525 via an E2 link, or a non-RT RIC 515 associated with a service management and orchestration (SMO) Framework 505, or both). A CU 510 may communicate with one or more DUs 530 via respective midhaul links, such as an F1 interface. The DUs 530 may communicate with one or more RUs 540 via respective fronthaul links. The RUs 540 may communicate with respective UEs 104 via one or more radio frequency (RF) access links. In some implementations, the UE 104 may be simultaneously served by multiple RUs 540.

Each of the units, i.e., the CUs 510, the DUs 530, the RUs 540, as well as the near-RT RICs 525, the non-RT RICs 515 and the SMO framework 505, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 510 may host higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 510. The CU 510 may be configured to handle user plane functionality (i.e., central unit-user plane (CU-UP)), control plane functionality (i.e., central unit-control plane (CU-CP)), or a combination thereof. In some implementations, the CU 510 can be logically split into one or more CU-UP units and one or more CU-CP units. The CU-UP unit can communicate bidirectionally with the CU-CP unit via an interface, such as the E1 interface when implemented in an O-RAN configuration. The CU 510 can be implemented to communicate with the DU 530, as necessary, for network control and signaling.

The DU 530 may correspond to a logical unit that includes one or more base station functions to control the operation of one or more RUs 540. In some aspects, the DU 530 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 530 may further host one or more low PHY layers. Each layer (or module) can be implemented with an interface configured to communicate signals with other layers (and modules) hosted by the DU 530, or with the control functions hosted by the CU 510.

Lower-layer functionality can be implemented by one or more RUs 540. In some deployments, an RU 540, controlled by a DU 530, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 540 can be implemented to handle over the air (OTA) communication with one or more UEs 104. In some implementations, real-time and non-real-time aspects of control and user plane communication with the RU(s) 540 can be controlled by the corresponding DU 530. In some scenarios, this configuration can enable the DU(s) 530 and the CU 510 to be implemented in a cloud-based RAN architecture, such as a virtual RAN (vRAN) architecture.

The SMO Framework 505 may be configured to support RAN deployment and provisioning of non-virtualized and virtualized network elements. For non-virtualized network elements, the SMO framework 505 may be configured to support the deployment of dedicated physical resources for RAN coverage requirements, which may be managed via an operations and maintenance interface (such as an O1 interface). For virtualized network elements, the SMO framework 505 may be configured to interact with a cloud computing platform (such as an open cloud (O-cloud) 590) to perform network element life cycle management (such as to instantiate virtualized network elements) via a cloud computing platform interface (such as an O2 interface). Such virtualized network elements can include, but are not limited to, CUs 510, DUs 530, RUs 540 and near-RT RICs 525. In some implementations, the SMO framework 505 can communicate with a hardware aspect of a 4G RAN, such as an open eNB (O-eNB) 511, via an O1 interface. Additionally, in some implementations, the SMO Framework 505 can communicate directly with one or more RUs 540 via an O1 interface. The SMO framework 505 also may include the non-RT RIC 515 configured to support functionality of the SMO Framework 505.

The non-RT RIC 515 may be configured to include a logical function that enables non-real-time control and optimization of RAN elements and resources, artificial intelligence/machine learning (AI/ML) workflows including model training and updates, or policy-based guidance of applications/features in the near-RT RIC 525. The non-RT RIC 515 may be coupled to or communicate with (such as via an A1 interface) the near-RT RIC 525. The near-RT RIC 525 may be configured to include a logical function that enables near-real-time control and optimization of RAN elements and resources via data collection and actions over an interface (such as via an E2 interface) connecting one or more CUs 510, one or more DUs 530, or both, as well as an O-eNB, with the near-RT RIC 525.

In some implementations, to generate AI/ML models to be deployed in the near-RT RIC 525, the non-RT RIC 515 may receive parameters or external enrichment information from external servers. Such information may be utilized by the near-RT RIC 525 and may be received at the SMO Framework 505 or the non-RT RIC 515 from non-network data sources or from network functions. In some examples, the non-RT RIC 515 or the near-RT RIC 525 may be configured to tune RAN behavior or performance. For example, the non-RT RIC 515 may monitor long-term trends and patterns for performance and employ AI/ML models to perform corrective actions through the SMO Framework 505 (such as reconfiguration via O1) or via creation of RAN management policies (such as A1 policies).

Examples of a Configured Cell Set

Figure 6:
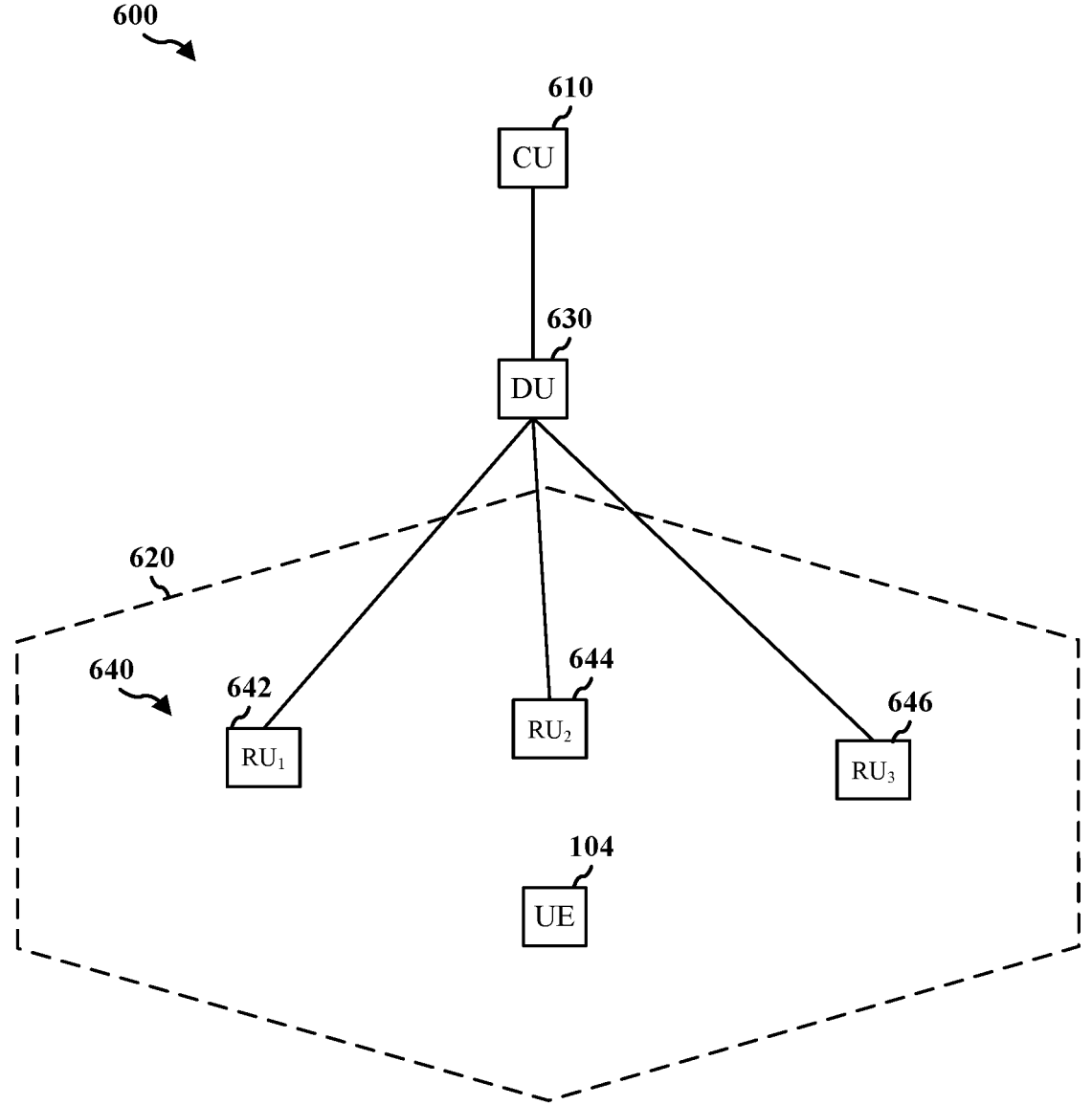
FIG. 6 is a schematic diagram illustrating such a set of cells as configured by a network node.

Still referring to FIG. 5, a DU 530 or CU 510 may configure a set of cells that support layer 1 (L1) and layer 2 (L2) UE 104 mobility. The set of cells may include the CU 510, the DU 530, and a plurality of RUs 540, wherein the plurality of RUs 540 are managed by the same DU 530. For example, FIG. 6 is a diagram 600 illustrating such a set of cells 620 (also referred to herein as a cell set 620). Here, the CU 610 and/or the DU 630 may configure the set of cells such that the CU 610 and the DU 630 manage a plurality of RUs 640. In this example, each cell in the set of cells includes the CU 610, the DU 630, and one of the plurality of RUs 640. For example, the CU 610, the DU 630, and a first RU 642 may make up a first cell of the plurality of cells, the CU 610, the DU 630, and a second RU 644 may make up a second cell of the plurality of cells, the CU 610, the DU 630, and a third RU 646 may make up a third cell of the plurality of cells. It should be noted that although FIG. 6 illustrates three RUs in the cell set 620, any suitable number of RUs may be used.

In this example, each cell of the set of cells 620 support L1 and L2 communications between the plurality of RUs 640 and the UE 104, and each cell may use the same or a different carrier frequency relative to another cell. Each cell may be configured as a primary cell (PCell) or a special cell (sPCell) and may use L1/L2 signaling to update a PCell/sPCell in the set of cells 620. Thus, one or more of the cells in the cell set 620 may be activated and used for data and control communications with one or more UEs via L1/L2 signaling.

As used herein, an "activated cell" is a cell that the UE 104 may communicate (e.g., transmit and receive wireless signals) data and control signals with. In some examples, the UE 104 may be configured to support multiple activated cells, or only a single activated cell (e.g., the second cell via the second RU 644). In the single activated cell case, the activation of a cell may be made with the assumption that another activated cell will be deactivated.

As used herein, a "deactivated cell" may relate to a cell with which the UE 104 cannot communicate data and control signals. For example, a deactivated cell may not be used for communication with the UE 104, but the deactivated cell may be activated via L1/L2 signaling and used as a PCell/sPCell once activated.

Examples Communications for Inter-Cell Mobility

Figure 7:
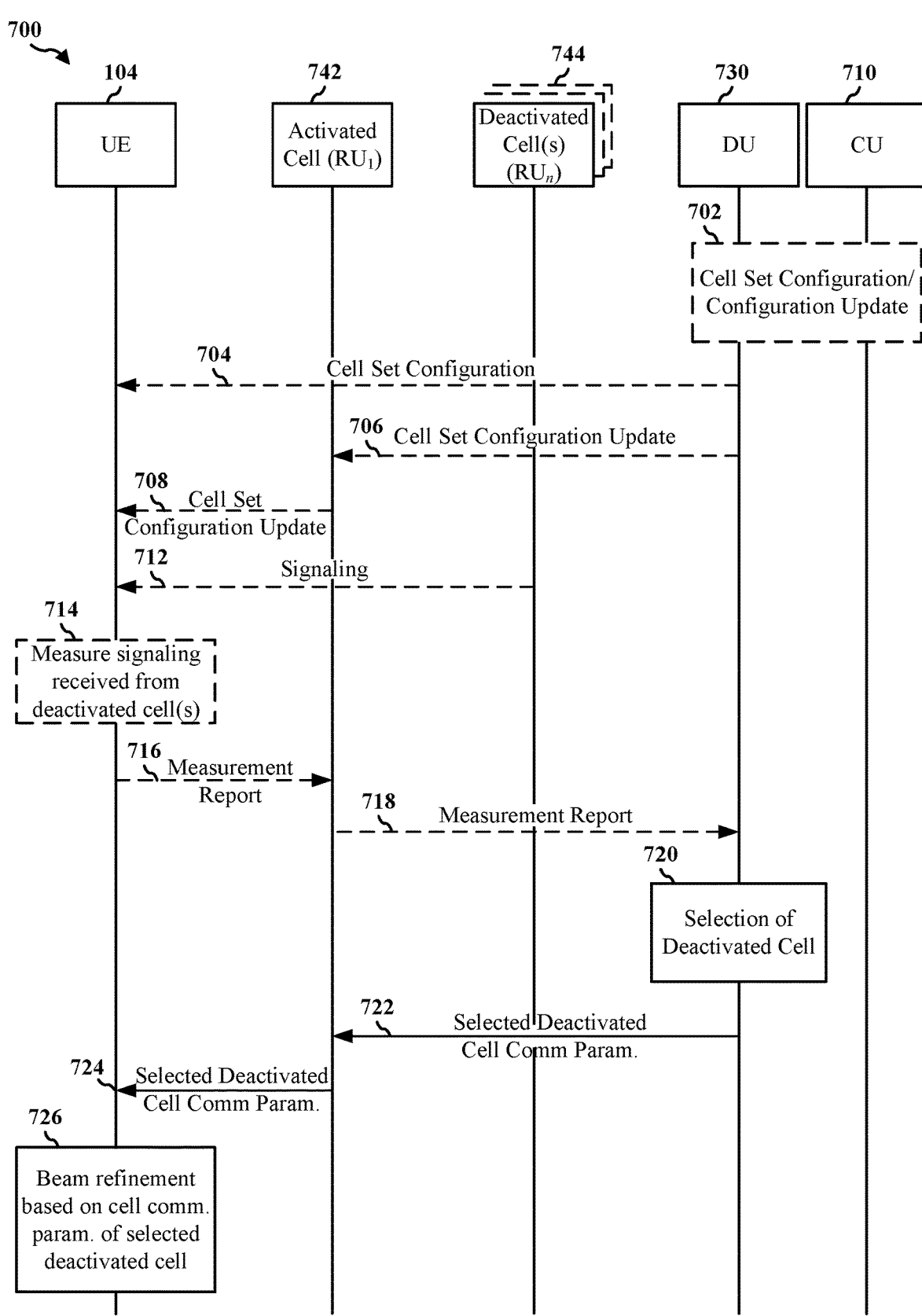
FIG. 7 is a call-flow diagram illustrating example communications between a UE and various network nodes that make up active and inactive cells within a cell set.

FIG. 7 is a call-flow diagram illustrating example communications 700 between a UE 104 and various network nodes that make up active and inactive cells. The communications include signaling transmitted by a UE 104 (e.g., UE 104 of FIGS. 1 and 3), an activated cell 742 (e.g., the first RU 642, the DU 630, and the CU 610 of FIG. 6), one or more deactivated cells 744 (e.g., the second RU 644 or the third RU 646, the DU 630, and the CU 610 of FIG. 6), a DU 730 (e.g., DU 530/630 of FIGS. 5 and 6), and a CU 710 (e.g., CU 510/610 of FIGS. 5 and 6). It should be noted that the activated cell 742 includes an RU (e.g., first RU (RU₁)) in communication between the UE 104 and the DU 730. Similarly, the one or more deactivated cells 744 include one or more other RUs (e.g., $RU_n$) managed by the same DU 730 between the UE 104 and the DU 730.

Initially, the DU 730 and/or CU may perform a first process 702 by determining a cell set. As discussed above, each cell may constitute an RU, a DU, and a CU, wherein the DU and CU may manage multiple RUs. Thus, the combination of each RU with the DU and CU may constitute an individual cell. In an example with multiple RUs, multiple cells may form a cell set as configured by the DU 730 and/or CU 710. In the example of FIG. 7, the cell set includes the activated cell 742 (e.g., the DU 730, the CU 710, and a first RU) and one or more deactivated cells (e.g., the DU 730, the CU 710, and one or more RUs other than the first RU).

In a first communication 704, the DU 730 may transmit a cell set configuration to the UE 104. In some examples, the cell set configuration may be provided by the DU 730 via an initial configuration between the UE 104 and the DU 730 and/or CU 710 (e.g., when the UE 104 is establishing connection with a cell). Thus, when the UE 104 receives the initial configuration from a cell, that cell may not yet be the serving cell for the UE 104.

Once a cell has been activated and can communicate (e.g., transmit and receive wireless signaling) with the UE 104, the DU 730 may transmit cell set configuration updates to the UE 104 via the activated cell 742 or serving cell. Thus, in a second communication 706, the DU may transmit the cell set configuration update to the first RU, which may pass the update to the UE 104 in a third communication 708.

The cell set configuration may include an indication of the activated cell 742 and one or more deactivated cells 744 within the cell set (e.g., one or more cell IDs and an indication of which is activated/deactivated), and a measurement configuration. The measurement configuration may include one or more of a rate at which the UE 104 measures signals from the one or more deactivated cells 744 and/or activated cell 742 (e.g., how often the UE 104 performs the measurement, whether the measurement is periodic, aperiodic, or event triggered), a type of measurement (e.g., received signal strength indicator (RSSI), reference signal received power (RSRP), reference signal received quality (RSRQ), signal to interference plus noise ratio (SINR), etc.) that the UE 104 is to perform on signaling received from the deactivated cells 744 and/or activated cell 742, and/or a rate at which the UE 104 transmits the measurement report to the DU 730. The cell set configuration update may include any updates to the cell set, for example, if a cell is deactivated or if a cell is added/removed from the cell set. In some examples, the cell set configuration update may include a TCI state change of the activated cell 742 and/or one or more deactivated cells 744.

In a fourth communication 712, the UE 104 may receive one or more signals from the one or more deactivated cells 744 (e.g., reference signals (RSs), SS/PBCH block, etc.). It should be noted that the received signals may be any signal suitable for an L1/L2 measurement to be made of the signal by the UE 104.

At a second process 714, the UE 104 may measure the received one or more signals using the type of measurement indicated in the cell set configuration of the first communication 704. The UE 104 may then transmit a measurement report to the activated cell 742 to be passed from the first RU to the DU 730 in a fifth communication 716 and a sixth communication 718. The measurement report may provide the DU 730 with an indication of the channel quality and/or signal power of signals received by the UE 104 from the one or more deactivated cells 744.

In a third process 720, the DU 730 may select a deactivated cell 744 as a candidate active cell or candidate SpCell/SCell based on the measurement report received from the UE 104. For example, the DU 730 may determine that the UE 104 received a high-quality signal from a deactivated cell 744 associated with an RU, and may determine that the deactivated cell would be a good replacement active cell for the UE 104. The determination may be based on QoS requirements of the UE 104, movement of the UE 104, etc. The selection may also be based (or alternatively based) on other communication parameters such as location of the UE, the cell location, the load on the cell (e.g., whether multiple cells have the same channel quality report and one cell has a smaller load, the DU may select the cell with the smaller load).

The DU 730 may also activate one or more communication parameters associated with the selected deactivated cell 744. For example, the DU 730 may activate one or more of a transmission configuration indicator (TCI) state or a reference signal (RS) (e.g., a channel state information reference signal (CSI-RS)) of the selected deactivated cell 744. Here, the selected deactivated cell remains deactivated, but a previously deactivated TCI state and/or previously deactivated RS of the deactivated cell becomes activated. That is, the UE 104 may use the TCI state or RS to perform beamforming operations (e.g., beam refinement) to determine an optimal beam for communication with the deactivated cell 744 prior to its activation.

At a seventh communication 722 and an eighth communication 724, the DU 730 may transmit, via the activated cell 742, the one or more communication parameters associated with the selected deactivated cell 744 to the UE 104. In some examples, the DU 730 may transmit the one or more communication parameters via a signal comprising: (i) an identifier of the selected deactivated cell, and (ii) the one or more communication parameters of the deactivated cell. The signal may be formatted as a medium access control (MAC) control element (CE), a downlink control information (DCI), or any other suitable format.

Using the one or more communication parameters, the UE 104 may perform a fourth process 726 including a beam refinement process wherein the UE 104 determines a proper beam for communication with an RU associated with the deactivated cell based on the one or more communication parameters (e.g., the activated TCI state and/or the activated RS). For example, the UE 104 may refine its own receive beam based on the activated TCI state and/or activated RS. It should be noted that, as discussed, the one or more communication parameters may be determined by one or more of the DU 730 or the CU 710 based on the measurement report provided by the UE 104 in the fifth communication 716 and the sixth communication 718. That is, the DU 730 and/or the CU 710 may activate a TCI state and/or RS at the deactivated cell 744 that is quasi-collocated (QCL'd) with the signal transmitted by the deactivated cell 744 (e.g., the corresponding RU) and used as the basis or the measurement indicated in the measurement report. Accordingly, the UE 104 may receive the activated TCI state or activated RS of the deactivated cell, and the UE 104 may perform beam refinement based on the TCI state. This provides the UE with an early ability to determine a suitable beam (e.g., receive beam) or beam pair to use when the deactivated cell 744 is activated, thereby providing for more rapid communication between the UE 104 and the deactivated cell 744 (after is it activated) relative to a conventional process where the beam refinement is not performed until after the deactivated cell is activated.

FIGS. 8A and 8B are block diagrams illustrating example MAC-CE formats that may be used to transmit the one or more communication parameters of the selected deactivated cell to the UE 104 of FIG. 7 (e.g., seventh communication 722 and eighth communication 724). As discussed above, the DU 730 may transmit one of the illustrated MAC-CE formats to the UE 104 via a currently active cell to provide the UE 104 with one or more of an activated TCI state and/or activated RS of a deactivated cell 744.

FIG. 8A illustrates a first MAC-CE 800 format that may be used to support communications where multiple activated cells can exist at one time. The first MAC-CE 800 includes a 32-bit (4 octet) bitmap 802 (also referred to as C-fields) wherein a first bit of the bit map is reserved (R). Each C-field (e.g., C1 to C31) may correspond to a cell of one or more cells within the cell set configured by the DU 730 and/or CU 710 of FIG. 7.

The first MAC-CE 800 may also include one or more temporary reference signal (TRS) identifier (ID) fields 804, wherein each TRS ID field corresponds to a specific cell (e.g., SpCell/SCell) that is being activated. Each of the TRS ID fields may correspond to a particular C-field in the bitmap 802 so that the TRS ID is mapped to a specific cell. The TRS ID may correspond to an information element (IE) (e.g., SCellActivationRS-ID) that defines an activated RS and/or a QCL of newly activated cell.

The first MAC-CE 800 may also include one or more deactivated TRS ID (TRS-D ID) fields 806. Here, a TRS-D ID octet may correspond to a deactivated cell identified by a C-field (e.g., C5). TRS-D IDs may provide TRS information (e.g., one or more of an activated RS, an activated TCI state, and/or QCL information) for a particular deactivated cell. For example, if the UE 104 measures a signal from a deactivated cell 744 (e.g., fourth communication 712 of FIG. 7) and transmits a measurement report (e.g., fifth communication 716 and sixth communication 718 of FIG. 7), the DU 730 may transmit the first MAC-CE 800 to the UE 104 via the activated cell 742. Here, the first MAC-CE 800 may include a TRS-D ID octet that provides QCL information regarding the signal of the deactivated cell 744 that the UE 104 measured. In another example, the TRS-D ID octet may also include an indication of an activated RS or an activated TCI state of the deactivated cell 744.

The DU 730 and/or CU 710 may provide TRS-D IDs for each deactivated cell in the cell set, or for only a subset (e.g., less than all deactivated cells in the cell set) of deactivated cells. For example, the DU 730 and/or CU 710 may only include TRS-D IDs for deactivated cells that are candidate cells for the UE 104. A deactivated cell may be determined to be a candidate cell based on one or more of: a measurement report indicating a signal quality of a deactivated cell 744 (e.g., a candidate cell may be equal to or greater than a threshold quality condition), a location of the UE 104 (e.g., a candidate cell may use an RU that is geographically close to the UE 104), a location of the cell, a loading of the cell (e.g., if the candidate cell has low traffic congestion relative to an activated cell 742 used by the UE 104), or if multiple deactivated cells were included in the measurement report and have the same measured quality. It should be noted that a candidate cell may be a deactivated cell that can potentially be used as an active cell or a serving cell for the UE 104 due to one or more of the signal quality of the candidate cell as measured by the UE 104, the location of the UE 104 and/or the candidate cell, and/or the traffic loading of the candidate cell.

The first MAC-CE 800 may also include a new cell ID field 808 configured to indicate an identifier of a newly activated cell (e.g., SCell/SpCell). In some examples, the new cell ID field 808 is configured to command the UE 104 to switch to the identified new cell. If the new cell is associated with multiple transmission/reception points (TRPs), then a TRP index field 810 may be included to identify which TRP of the multiple TRPs the UE 104 will use for communication with the new cell. The first MAC-CE 800 may also include a cell configuration ID field 812 providing the UE 104 with configuration information about the newly activated cell identified in the new cell ID field 808. The first MAC-CE 800 may also include one or more L1 measurement ID fields 814 indicating a type of measurement the UE 104 is to use when performing L1 measurements on a signal transmitted by an activated cell identified by the TRS ID fields 804 or a deactivated cell identified by the TRS-D ID fields 806.

FIG. 8B illustrates a second MAC-CE 850 format for use in a single activated cell operation. It should be noted that the bitmap 802 of the first MAC-CE 800 is not present because only one activated cell may be indicated by the second MAC-CE 805.

Here, the second MAC-CE 850 includes the cell ID field 852 of a newly activated cell (e.g., similar to the new cell ID field 808 of FIG. 8A), a TRP index field 854 (e.g., similar to the TRP index field 810 of FIG. 8A), a configuration ID field 856 of the newly activated cell (e.g., similar to the cell configuration ID field 812 of FIG. 8A), a TRS ID field 858, one or more TRS-D ID fields 860 (e.g., similar to the one or more TRS-D ID fields 806 of FIG. 8A), and one or more L1 measurement ID fields 862 (e.g., similar to the one or more L1-meas-ID fields 814 of FIG. 8A).

FIG. 9 is a flowchart 900 of a method of wireless communication. The method may be performed by a network node such as a base station (e.g., the base station 102/180; the apparatus 1002) or a node associated with the base station (e.g., a CU 410/510/610, a DU 414/530/630, or an RU 420/540/640 of FIGS. 4, 5, and 6). At 902, the network node may optionally transmit, to a UE, a configuration of a cell set managed by the network node. For example, 902 may be performed by a transmission component 1040. Here, the network node may transmit an identifier for each of the cells managed by the network node, including an indication of whether a particular cell is one or more of an activated cell or a deactivated cell. In some examples the configuration of the cell set may include additional information of one or more of the cells, such as: one or more active TCI states, one or more active RSs, and/or QCL information of the one or more active RSs. In some examples the configuration of the cell set may be an update of a cell set already configured at the UE. Communication of the configuration of the cell set and the updated configuration is illustrated in the first process 702, the first communication 704, the second communication 706, and the third communication 708 of FIG. 7.

At 904, the network node may optionally receive, from the UE, the measurement report, wherein the measurement report comprises a layer 1 (L1) measurement of a reference signal (RS) or a synchronization signal block (SSB) transmitted by the deactivated cell. For example, 904 may be performed by a reception component 1030. In some examples, a UE may perform L1/L2 measurements of signals transmitted from deactivated cells in the cell set. The UE may then transmit the measurements to the network node. For example, as illustrated in FIG. 7, the UE may receive signaling of the fourth communication 712 and measure the signaling in the second process 714. The UE may then transmit a measurement report comprising an indication of the measured signals to the network node (e.g., fifth communication 716 and sixth communication 718).

At 906, the network node may select a deactivated cell based on at least one of a measurement report received from a user equipment (UE) or a first communication parameter, the deactivated cell being one of a plurality of cells within a cell set managed by the network node. For example, 906 may be performed by a selection component 1044. Here, the network node may select a deactivated cell based on one or more of the measurement report or the first communication parameter. For example, the measurement report may provide an indication to the network node that a signal received from a first deactivated cell satisfies a quality condition (e.g., has an RSRP, RSSI, SINR, RSRQ, etc. that satisfies a threshold value) indicating that the first deactivated cell is a candidate PCell/SCell/SpCell for communication with the UE. In another example, the network node may perform the selection based a first communication parameter, such as: a location of the UE, a location of a deactivated cell, a loading (e.g., traffic) experienced by a deactivated cell, etc. For example, the selection of the deactivated cell may be performed by a DU, as illustrated in the third process 720 of FIG. 7.

At 908, the network node may activate at least one of a first TCI state or a first RS of the deactivated cell in response to at least one of the measurement report or the first communication parameter. For example, 908 may be performed by an activation component 1046. Here, the network node may activate the at least one of the first TCI state or the first RS during the third process 720 of FIG. 7 in response to selecting the deactivated cell. Thus, once the deactivated cell is selected, the network node may activate at least one of a first TCI state or a first RS of the deactivated cell such that the deactivated cell remains deactivated.

Finally, at 910, the network node may transmit, to the UE via an activated cell of the cell set, a signal comprising: (i) an identifier of the deactivated cell, and (ii) a second communication parameter of the deactivated cell. For example, 910 may be performed by the transmission component 1040. Here, after selecting the deactivated cell and activating TCI state or RS of the deactivated cell, the network node may provide the UE with an identifier of the deactivated node (e.g., TRD-D ID field 806/860 of the first MAC-CE or second MAC-CE of FIGS. 8A and 8B), and an indication of at least one of an activated TCI state of the deactivated cell or an activated RS of the deactivated cell (e.g., TRD-D ID field 806/860 of the first MAC-CE or second MAC-CE of FIGS. 8A and 8B).

In certain aspects, the first communication parameter comprises one or more of a location of the UE, a location of the deactivated cell, or a loading of the deactivated cell.

In certain aspects, the second communication parameter comprises at least one of an activated first transmission configuration indicator (TCI) state of the deactivated cell or an activated first reference signal (RS) of the deactivated cell.

In certain aspects, the signal is a medium access control (MAC) control element (CE) (e.g., the first MAC-CE 800 or the second MAC-CE 850 of FIGS. 8A and 8B). That is, the seventh communication 722 and the eighth communication 724 of FIG. 7 may be made using one of the first MAC-CE 800 or the second MAC-CE 850 of FIGS. 8A and 8B.

In certain aspects, the configuration of the cell set comprises: an indication of the activated cell and one or more deactivated cells within the cell set; and a measurement configuration indicating one or more of a first rate at which the UE measures signals from the one or more deactivated cells or a second rate at which the UE transmits the measurement report.

In certain aspects, the network node is implemented as a distributed unit (DU), the activated cell is implemented by a centralized unit (CU), the DU, and a first radio unit (RU) of the cell set, and the deactivated cell is implemented by the CU, the DU, and a second RU of the cell set.

Figure 10:
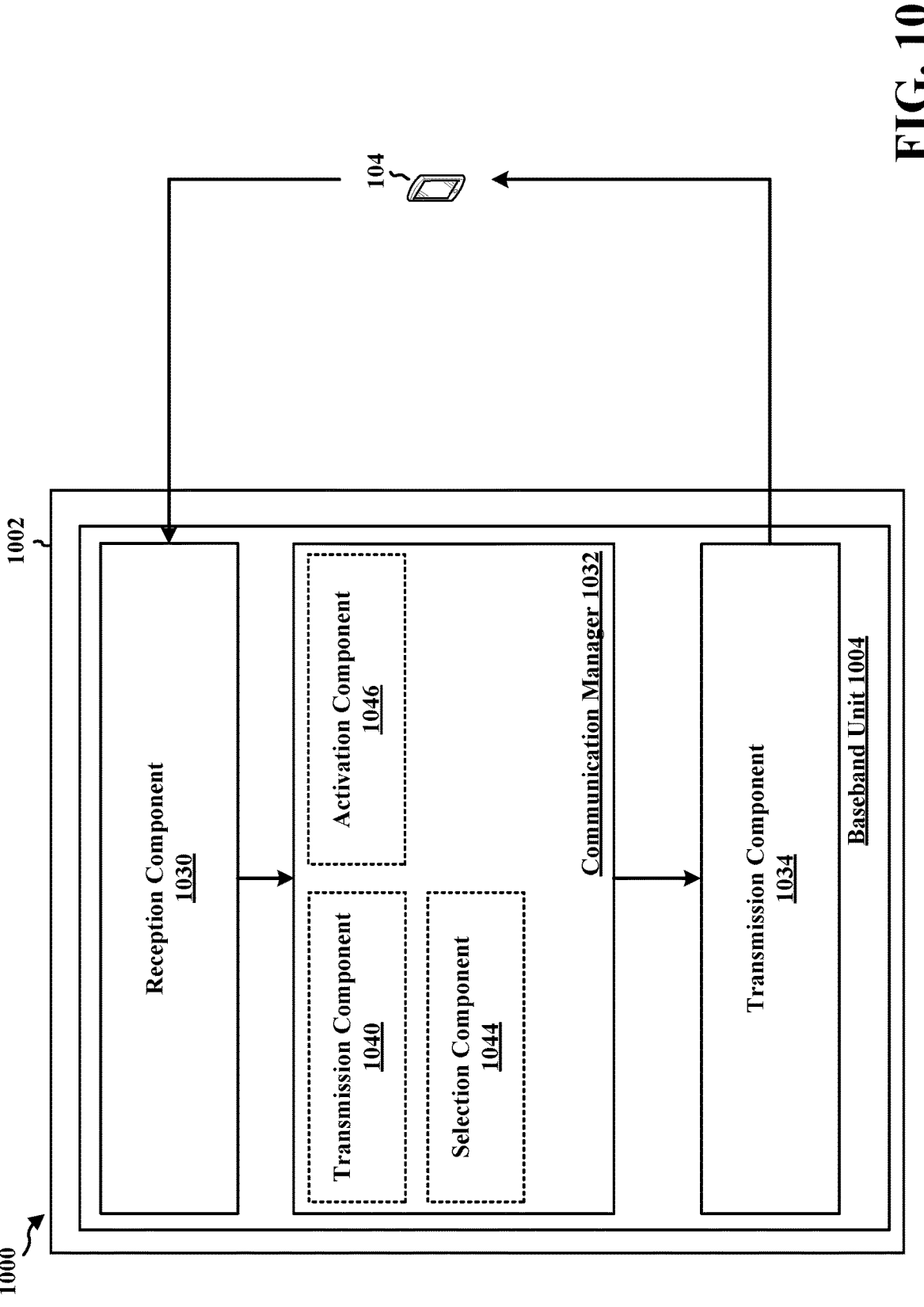
FIG. 10 is a diagram illustrating an example of a hardware implementation for an example apparatus.

FIG. 10 is a diagram 1000 illustrating an example of a hardware implementation for an apparatus 1002. The apparatus 1002 is a network node and includes a baseband unit 1004. The baseband unit 1004 may communicate through a cellular RF transceiver with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the network node 102 and may include the memory 376 and/or at least one of the TX processor 316, the RX processor 370, and the controller/processor 375.

The communication manager 1032 includes a transmission component 1040 configured to transmit, to the UE, a configuration of the cell set managed by the network node; and transmit, to the UE via an activated cell of the cell set, a signal comprising: (i) an identifier of the deactivated cell, and (ii) a second communication parameter of the deactivated cell; e.g., as described in connection with 902 and 910 of FIG. 9.

The communication manager 1032 includes a reception component 1030 configured to receive, from the UE, the measurement report, wherein the measurement report comprises a layer 1 (L1) measurement of a reference signal (RS) or a synchronization signal block (SSB) transmitted by the deactivated cell; e.g., as described in connection with 904 of FIG. 9.

The communication manager 1032 includes a selection component 1044 configured to select a deactivated cell based on at least one of a measurement report received from a user equipment (UE) or a first communication parameter, the deactivated cell being one of a plurality of cells within a cell set managed by the network node; e.g., as described in connection with 906 of FIG. 9.

The communication manager 1032 includes an activation component 1046 configured to activate at least one of the first TCI state or the first RS of the deactivated cell in response to at least one of the measurement report or the first communication parameter; e.g., as described in connection with 908 of FIG. 9.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for transmitting, to the UE, a configuration of the cell set managed by the network node; means for receiving, from the UE, the measurement report, wherein the measurement report comprises a layer 1 (L1) measurement of a reference signal (RS) or a synchronization signal block (SSB) transmitted by the deactivated cell; means for selecting a deactivated cell based on at least one of a measurement report received from a user equipment (UE) or a first communication parameter, the deactivated cell being one of a plurality of cells within a cell set managed by the network node; means for activating at least one of the first TCI state or the first RS of the deactivated cell in response to at least one of the measurement report or the first communication parameter; and means for transmitting, to the UE via an activated cell of the cell set, a signal comprising: (i) an identifier of the deactivated cell, and (ii) a second communication parameter of the deactivated cell.

The aforementioned means may be one or more of the aforementioned components of the apparatus 1002 configured to perform the functions recited by the aforementioned means. As described supra, the apparatus 1002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

FIG. 11 is a flowchart 1100 of a method of wireless communication. The method may be performed by a UE (e.g., UE 104; the apparatus 1202). At 1102, the UE may optionally receive, via the activated cell, a configuration of the cell set managed by the network node. For example, 1102 may be performed by the reception component 1230. The network node may configure a cell set comprising a plurality of cells, wherein at least one of the cells is active (e.g., activated) and one or more of the cells is deactivated. The network node may then transmit an indication of the cell set, and any updates to the cell set configuration, to the UE as illustrated in the first communication 704, the second communication 706, and the third communication 708 of FIG. 7.

At 1104, the UE may optionally transmit, to the network node, a measurement report based on a layer 1 (L1) measurement of a reference signal (RS), or a synchronization signal block (SSB) transmitted by the deactivated cell, wherein the signal is received in response to the measurement report. For example, 1104 may be performed by a transmission component 1240. Here, the UE may measure signals transmitted by deactivated cells within the cell set and transmit a measurement report to the network node as illustrated in the second process 714, the fifth communication 716, and the sixth communication 718.

At 1106, the UE may receive, via an activated cell of a cell set managed by a network node, a signal comprising: (i) an identifier of a deactivated cell, and (ii) a second communication parameter of the deactivated cell, the deactivated cell being one of a plurality of cells within the cell set. For example, 1106 may be performed by the reception component 1230. Here, the UE may receive an indication of an activated cell via the network node, as illustrated in the seventh communication 722 and the eighth communication 724 of FIG. 7.

At 1108, the UE may perform beam refinement with the deactivated cell based on the second communication parameter. For example, 1108 may be performed by the beam component 1242. Here, the UE may perform a beam refinement procedure, while the deactivated cell is deactivated, to determine a receive beam to use for communication with the deactivated cell once it is activated, as illustrated in the fourth process 726 of FIG. 7.

Figure 12:
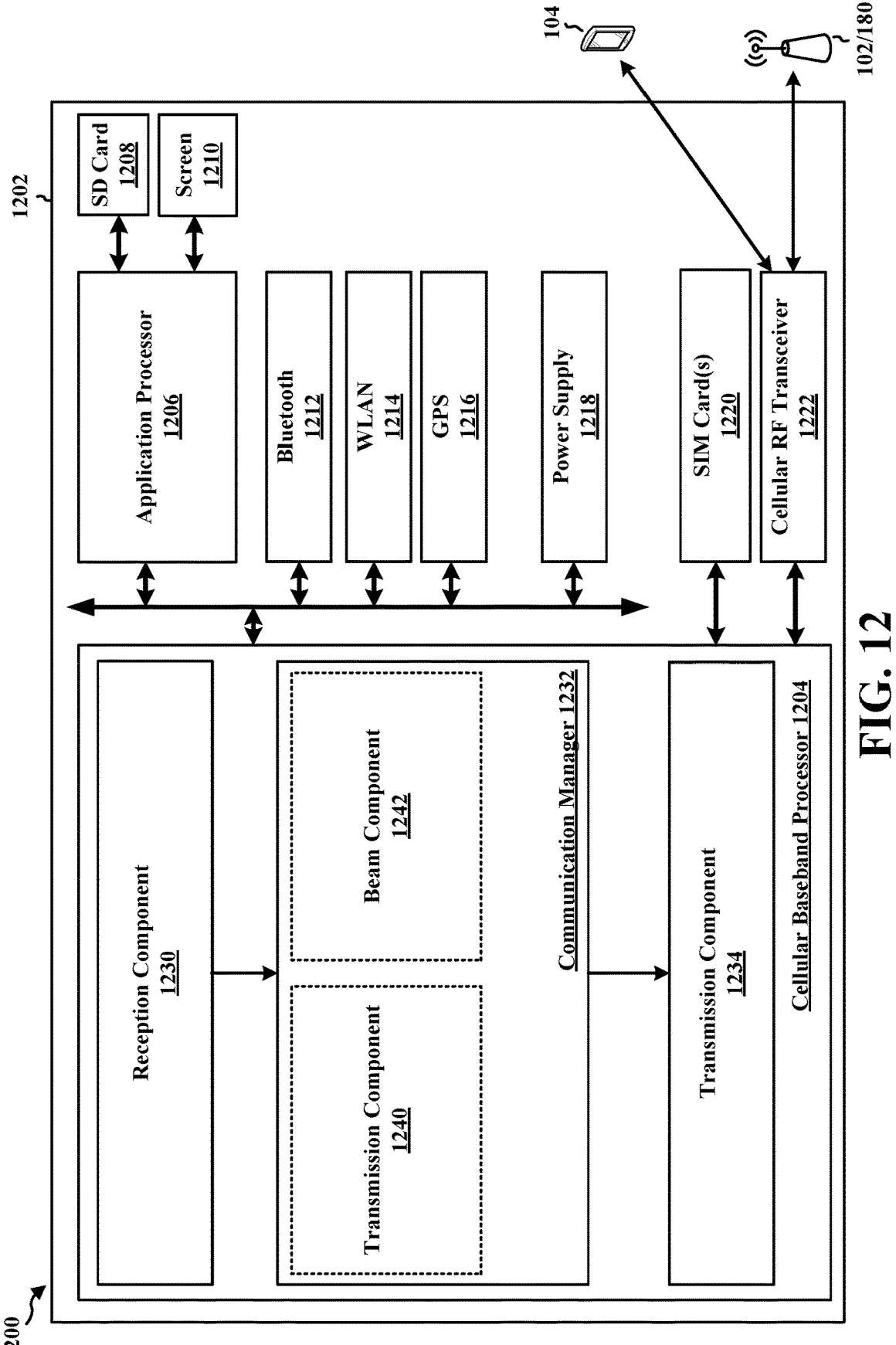
FIG. 12 is a diagram illustrating another example of a hardware implementation for another example apparatus.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 104 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 104 of FIG. 3) and include the aforediscussed additional modules of the apparatus 1202.

The communication manager 1232 includes a transmission component 1240 that is configured to transmit, to the network node, a measurement report based on a layer 1 (L1) measurement of a reference signal (RS) or a synchronization signal block (SSB) transmitted by the deactivated cell, wherein the signal is received in response to the measurement report, e.g., as described in connection with 1104.

The communication manager 1232 further includes a beam component 1242 configured to perform beam refinement with the deactivated cell based on the second communication parameter; e.g., as described in connection with 1108.

The communication manager 1232 further includes a reception component 1230 configured to receive, via the activated cell, a configuration of the cell set managed by the network node, and receive, via an activated cell of a cell set managed by a network node, a signal comprising: (i) an identifier of a deactivated cell, and (ii) a second communication parameter of the deactivated cell, the deactivated cell being one of a plurality of cells within the cell set; e.g., as described in connection with 1102 and 1106.

The apparatus may include additional components that perform each of the blocks of the algorithm in the aforementioned flowcharts of FIG. 11. As such, each block in the aforementioned flowcharts of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for receiving, via the activated cell, a configuration of the cell set managed by the network node; means for transmitting, to the network node, a measurement report based on a layer 1 (L1) measurement of a reference signal (RS) or a synchronization signal block (SSB) transmitted by the deactivated cell, wherein the signal is received in response to the measurement report; means for receiving, via an activated cell of a cell set managed by a network node, a signal comprising: (i) an identifier of a deactivated cell, and (ii) a second communication parameter of the deactivated cell, the deactivated cell being one of a plurality of cells within the cell set; and means for performing beam refinement with the deactivated cell based on the second communication parameter.

The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

ADDITIONAL CONSIDERATIONS

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

EXAMPLE ASPECTS

The following examples are illustrative only and may be combined with aspects of other embodiments or teachings described herein, without limitation.

Example 1 is a method for wireless communication by a network node, comprising: selecting a deactivated cell based on at least one of a measurement report received from a user equipment (UE) or a first communication parameter, the deactivated cell being one of a plurality of cells within a cell set managed by the network node; and transmitting, to the UE via an activated cell of the cell set, a signal comprising: (i) an identifier of the deactivated cell, and (ii) a second communication parameter of the deactivated cell.

Example 2 is the method of example 1, wherein the first communication parameter comprises one or more of a location of the UE, a location of the deactivated cell, or a loading of the deactivated cell.

Example 3 is the method of any of examples 1 and 2, wherein the second communication parameter comprises at least one of an activated first transmission configuration indicator (TCI) state of the deactivated cell or an activated first reference signal (RS) of the deactivated cell.

Example 4 is the method of example 3, further comprising: activating at least one of the first TCI state or the first RS of the deactivated cell in response to at least one of the measurement report or the first communication parameter.

Example 5 is the method of any of examples 1-4, further comprising: receiving, from the UE, the measurement report, wherein the measurement report comprises a layer 1 (L1) measurement of a reference signal (RS) or a synchronization signal block (SSB) transmitted by the deactivated cell.

Example 6 is the method of any of examples 1-5, wherein the signal is a medium access control (MAC) control element (CE).

Example 7 is the method of any of examples 1-6, further comprising: transmitting, to the UE, a configuration of the cell set managed by the network node.

Example 8 is the method of example 7, wherein the configuration of the cell set comprises: an indication of the activated cell and one or more deactivated cells within the cell set; and a measurement configuration indicating one or more of a first rate at which the UE measures signals from the one or more deactivated cells or a second rate at which the UE transmits the measurement report.

Example 9 is the method of any of examples 1-8, wherein: the network node is implemented as a distributed unit (DU), the activated cell is implemented by a centralized unit (CU), the DU, and a first radio unit (RU) of the cell set, and the deactivated cell is implemented by the CU, the DU, and a second RU of the cell set.

Example 10 is a method for wireless communication by a user equipment (UE), comprising: receiving, via an activated cell of a cell set managed by a network node, a signal comprising: (i) an identifier of a deactivated cell, and (ii) a second communication parameter of the deactivated cell, the deactivated cell being one of a plurality of cells within the cell set; and performing beam refinement with the deactivated cell based on the second communication parameter.

Example 11 is the method of example 10, wherein the first communication parameter comprises at least one of an activated first transmission configuration indicator (TCI) state of the deactivated cell or an activated first reference signal (RS) of the deactivated cell.

Example 12 is the method of any of examples 10 and 11, further comprising: transmitting, to the network node, a measurement report based on a layer 1 (L1) measurement of a reference signal (RS) or a synchronization signal block (SSB) transmitted by the deactivated cell, wherein the signal is received in response to the measurement report.

Example 13 is the method of any of examples 10-12, wherein the signal is a medium access control (MAC) control element (CE).

Example 14 is the method of any of examples 10-13, further comprising: receiving, via the activated cell, a configuration of the cell set managed by the network node.

Example 15 is the method of example 14, wherein the configuration of the cell set comprises: an indication of the activated cell and one or more deactivated cells within the cell set; and a measurement configuration indicating one or more of a first rate at which the UE measures signals from the one or more deactivated cells or a second rate at which the UE transmits the measurement report.

Example 16 is a network node comprising a memory and a processor coupled to the memory, the processor and memory being configured to perform the method of any of examples 1-9.

Example 17 is a user equipment (UE) comprising a memory and a processor coupled to the memory, the processor and memory being configured to perform the method of any of examples 10-15.

Example 18 is a network node comprising one or more means for performing the method of any of examples 1-9.

Example 19 is a user equipment (UE) comprising one or more means for performing the method of any of examples 10-15.

Example 20 is a non-transitory computer-readable storage medium having instructions stored thereon for performing the method of any of examples 1-9 for wireless communication by a network node.

Example 21 is a non-transitory computer-readable storage medium having instructions stored thereon for performing the method of any of examples 10-15 for wireless communication by a user equipment (UE).

What is claimed is:

1. A user equipment (UE) for wireless communication, comprising:

a memory; and at least one processor coupled to the memory and configured to:

receive, via an activated cell of a cell set managed by a network node, a configuration of the cell set managed by the network node, the configuration of the cell set comprising:

an indication of the activated cell and one or more deactivated cells within the cell set, and a measurement configuration indicating one or more of a first rate at which the UE measures signals from the one or more deactivated cells or a second rate at which the UE transmits a measurement report;

transmit, to the network node, a measurement report based on a layer 1 (L1) measurement of a reference signal (RS) or a synchronization signal block (SSB) transmitted by a deactivated cell of the one or more deactivated cells;

receive, via the activated cell and in response to the measurement report, a signal comprising: (i) an identifier of the deactivated cell, and (ii) a first communication parameter of the deactivated cell; and perform receive-beam refinement with the deactivated cell based on the first communication parameter, wherein the receive-beam refinement is configured to determine a UE-side receive beam to use for communication with the deactivated cell when the deactivated cell becomes activated.

2. The UE of claim 1, wherein the first communication parameter comprises at least one of an activated first transmission configuration indicator (TCI) state of the deactivated cell or an activated first reference signal (RS) of the deactivated cell.

3. The UE of claim 1, wherein the signal is a medium access control (MAC) control element (CE).

4. A method for wireless communication by a user equipment (UE), comprising:

receiving, via an activated cell of a cell set managed by a network node, a configuration of the cell set managed by the network node, the configuration of the cell set comprising:

an indication of the activated cell and one or more deactivated cells within the cell set, and a measurement configuration indicating one or more of a first rate at which the UE measures signals from the one or more deactivated cells or a second rate at which the UE transmits a measurement report;

transmitting, to the network node, a measurement report based on a layer 1 (L1) measurement of a reference signal (RS) or a synchronization signal block (SSB) transmitted by a deactivated cell of the one or more deactivated cells;

receiving, via the activated cell and in response to the measurement report, a signal comprising: (i) an identifier of the deactivated cell, and (ii) a first communication parameter of the deactivated cell; and performing receive-beam refinement with the deactivated cell based on the first communication parameter, wherein the receive-beam refinement is configured to determine a UE-side receive beam to use for communication with the deactivated cell when the deactivated cell becomes activated.

5. The method of claim 4, wherein the first communication parameter comprises at least one of an activated first transmission configuration indicator (TCI) state of the deactivated cell or an activated first reference signal (RS) of the deactivated cell.

6. The method of claim 4, wherein the signal is a medium access control (MAC) control element (CE).

7. A non-transitory computer-readable medium storing one or more instructions that, when executed by one or more processors of a user equipment (UE), cause the UE to:

receive, via an activated cell of a cell set managed by a network node, a configuration of the cell set managed by the network node, the configuration of the cell set comprising:

an indication of the activated cell and one or more deactivated cells within the cell set, and a measurement configuration indicating one or more of a first rate at which the UE measures signals from the one or more deactivated cells or a second rate at which the UE transmits a measurement report;

transmit, to the network node, a measurement report based on a layer 1 (L1) measurement of a reference signal (RS) or a synchronization signal block (SSB) transmitted by a deactivated cell of the one or more deactivated cells;

receive, via the activated cell and in response to the measurement report, a signal comprising: (i) an identifier of the deactivated cell, and (ii) a first communication parameter of the deactivated cell; and perform receive-beam refinement with the deactivated cell based on the first communication parameter, wherein the receive-beam refinement is configured to determine a UE-side receive beam to use for communication with the deactivated cell when the deactivated cell becomes activated.

8. The non-transitory computer-readable medium of claim 7, wherein the first communication parameter comprises at least one of an activated first transmission configuration indicator (TCI) state of the deactivated cell or an activated first reference signal (RS) of the deactivated cell.

9. The non-transitory computer-readable medium of claim 7, wherein the signal is a medium access control (MAC) control element (CE).

* * * * *